United States Patent [19]

Takeda et al.

[11] Patent Number: 4,954,596

[45] Date of Patent: Sep. 4, 1990

[54] PROCESS FOR MANUFACTURING ORGANIC SILAZANE POLYMERS AND CERAMICS THEREFROM

[75] Inventors: Yoshifumi Takeda; Minoru Takamizawa; Tsutomu Takeno, all of Kubikimura, Japan

[73] Assignee: Shin-Etsu Chemical Col, Ltd., Tokyo, Japan

[21] Appl. No.: 283,316

[22] Filed: Dec. 12, 1988

[30] Foreign Application Priority Data

Dec. 11, 1987 [JP] Japan .................. 62-313264

[51] Int. Cl.$^5$ ............................ C08G 77/06
[52] U.S. Cl. .................... 528/14; 528/28; 528/38
[58] Field of Search ............... 528/14, 28, 38

[56] References Cited

U.S. PATENT DOCUMENTS

| | | | |
|---|---|---|---|
| 3,853,567 | 12/1974 | Verbeek | 106/44 |
| 4,097,294 | 6/1978 | Rice et al. | 106/43 |
| 4,312,970 | 1/1982 | Gaul, Jr. | 526/279 |
| 4,395,460 | 7/1983 | Gaul | 428/408 |
| 4,404,153 | 9/1983 | Gaul, Jr. | 264/29.2 |
| 4,482,669 | 11/1984 | Seyferth et al. | 524/442 |
| 4,482,689 | 11/1984 | Haluska | 528/25 |
| 4,535,007 | 8/1985 | Cannady | 427/226 |
| 4,540,803 | 9/1985 | Cannady | 556/412 |
| 4,595,775 | 6/1986 | Arkles | 556/409 |
| 4,720,532 | 1/1988 | Seyferth et al. | 528/28 |
| 4,771,118 | 9/1988 | Takamizawa et al. | 528/28 |

FOREIGN PATENT DOCUMENTS

0255132 2/1988 European Pat. Off. .

OTHER PUBLICATIONS

Andrianov, M. V. Lomonosov Moscow Institute of Fine Chem. Techn., "Synthesis of Isotopically Substituted Organosilazanes and Some Features of Their IR Spectra", Zhurnal Obshcheimii, vol. 49, No. 12, pp. 2683–2689, Dec., 1979.

V. V. Kazakova, et al., "Chemical Properties of Organooligocyclosilazanes and the Synthesis of Polymers on Their Basis", Polymer Science USSR, vol. 26, No. 8, pp. 1889–1897, 1984.

Andrianov, et al., J. Organometal. Schem., 3 (1965) 129–137, "Reactions of Organocyclosilazanes w. Electrophilic and Nucleophilic Reagents".

Zhdanov et al., Polymer Science USSR vol. 23, No. 6, pp. 1429–1438, "Catalytic Polycondensation of Organosilazanes".

Andrianov, et al., M. V. Lomonosov Moscow Institute of Fine Chem. Techn., "Reaction of $\alpha,\omega$-Dihydromethylsilzanes with Nucleophilic Reagents", Doklady Akademii Nauk SSSR, vol. 176, No. 1, pp. 85–88, Sept., 1967.

Primary Examiner—Melvyn I. Marquis
Attorney, Agent, or Firm—McAulay Fisher Nissen & Goldberg

[57] ABSTRACT

A process for manufacturing an organic silazane polymer which comprises: reacting ammonia with a mixture of organosilicic compounds (I) and (II) wherein R is a methyl group, an ethyl group, or a phenyl group, and $R_1$ is a hydrogen atom or a vinyl group, and X is a chlorine or a bromine atom; then polymerizing the thus obtained silazane compound in the presence of an alkali catalyst. A process for manufacturing a ceramic fiber which comprises melting, spinning, and rendering the organic silazane polymer infusible and then baking the same is also disclosed, as are improved silazane polymers and ceramic articles made therefrom.

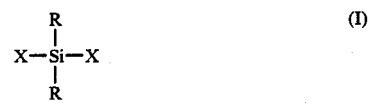

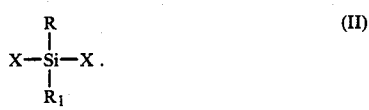

10 Claims, No Drawings

PROCESS FOR MANUFACTURING ORGANIC SILAZANE POLYMERS AND CERAMICS THEREFROM

BACKGROUND OF THE INVENTION

This invention relates to a process for manufacturing organic silazane polymers which are suitably used as precursors for ceramic materials, and also to a process for manufacturing ceramics from the organic silazane polymers.

Great interest has been currently shown in ceramics as materials which have excellent properties, such as heat resistance, abrasion resistance, and high-temperature strength, i.e., physical strength at high temperatures. However, because of the hardness and poor chip resistance, such ceramics are very difficult to machine and shape. Methods used to manufacture shaped ceramic articles from such materials include molding a fine powder of the ceramic material into a desired form, such as by compression, followed by sintering, or a "precursor" method in which an organic polymer, serving as a preceramic material, is first melted or dissolved in a solvent, fabrication into a desired form, and sintered to render the polymer inorganic. The main advantage of the precursor method is that ceramic products having complex shapes can be formed, e.g., products in forms, such as fibers and sheets, which cannot be obtained with the fine powder sintering method.

Materials generally used as such ceramics include SiC and $Si_3N_4$. These have attracted considerable attention because of their good high temperature properties. For example, SiC has a high heat resistance and a high-temperature strength, and $Si_3N_4$ has a high thermal shock resistance and a high fracture toughness. Accordingly, various proposals have been made for processes of producing SiC—$Si_3N_4$ ceramics and also for processes of producing organic silicon precursors using the precursor method. These processes and their disadvantages are described in paragraphs (1) to (7) below. Incidentally, infusibilization herein defined is to render an organic substance unable or difficult to melt at temperatures higher than its melting point without turning it inorganic. Sintering herein defined is to turn an organic substance inorganic by heating it at high temperatures.

(1) U.S. Pat. No. 3,853,567 discloses a process of obtaining SiC—$Si_3N_4$ ceramics wherein chlorosilanes and amines are reacted and subsequently heated at high temperatures to obtain carbosilazanes. These are then spun, infusibilized, and sintered at high temperatures of from 800° to 2000° C. However, the high temperatures required of from 520° to 650° C. to obtain the carbosilazanes renders this process very difficult to adopt industrially. In addition, this process is disadvantageous in that the yield of inorganic ceramic materials from the carbosilazanes, is low, e.g., about 55%. In the Examples of this U.S. Patent specification only methyltrichlorosilane and dimethyldichlorosilane are exemplified as the chlorosilanes, and methylamine as the amines.

(2) U.S. Pat. No. 4,097,294 teaches the conversion of various silicon-containing polymers into ceramic materials by pyrolysis. However, it discloses only one example of a silazane polymer and the ceramic yield is as low as 12% at best. Although this United States patent specification indicates that ceramic materials may be formed into fibers or thin films, this is merely a suggested possibility. In fact, little mention is made of the moldability and processability of polymers, which is considered to be among the most important aspects of the precursor method.

(3) Numerous methods for the production of silazane polymers have been disclosed. For example, by the reaction between chlorodisilanes and disilazanes shown in U.S. Pat. No. 4,404,153; by the reaction between chlorosilanes and disilazanes shown in U.S. Pat. No. 4,312,970; by the reaction between chlorodisilanes and ammonia disclosed in U.S. Pat. No. 4,395,460; and by the reaction between trichlorosilane and disilazanes disclosed in U.S. Pat. No. 4,540,803, respectively. Moreover, U.S. Pat. No. 4,535,007 discloses the production of silazane polymers wherein metal halides are added to chlorosilanes and disilazanes, and U.S. Pat. No. 4,482,689 discloses another method wherein metal halides are added to chlorodisilanes and disilazanes. It is stated in each of these references that the respective silazane polymers may be converted to ceramic materials by pyrolysis. However, the ceramic yields for these silazane polymers are only 50 to 60 wt %. Also, as in the patent specification referred to in (2) above, none of these references describes in detail the moldability and processability of the polymers, which are most important aspects in the precursor method. In particular, most of the references do not provide any examples for making ceramic fibers, and those showing examples of ceramic fibers do not refer to the strength of the ceramic fibers. Only U.S. Pat. No. 4,482,689 contains a description of the strength of the fiber; however, according to the disclosure, the ceramic fibers have a low tensile strength such as 53 kg/mm² or 63 kg/mm².

(4) U.S. Pat. No. 4,482,669 describes a process for preparing silazane polymers which comprises reacting ammonia with an organosilicic compound of the formula,

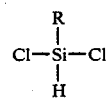

to obtain an ammonolysis product and subjecting the product to condensation by dehydrogenation with alkali metal hydrides or alkaline earth metal hydrides. It is stated that the polymers obtained in this process can be controlled to have various forms from oils to solids having extremely high melting points, depending on the degree of condensation by dehydrogenation. However, when a polymer melt is molded or processed to prepare, for example, a continuous fiber by melt spinning, it is necessary that the polymer have a certain degree of polymerization and be thermally stable. In the above process, however, the polymer obtained will be in the form of a solid having an extremely high melting point, unless the polymerization is stopped halfway. In order to obtain a conveniently fusible polymer, the reaction time, reaction temperature, amounts of catalyst and solvent, etc., have to be controlled precisely. However, such control may be very difficult to achieve and may not be reproducible. The polymers obtained by the process are not thermally stable, and have the disadvantage that gel-like substances are formed. In view of the above two problems, this process may not be considered suitable as an industrial process of manufacturing silazane polymers.

(5) U.S. Pat. No. 4,595,775 describes a process for preparing a silazane polymer which comprises producing a cyclic silazane from a reaction between a compound of the formula:

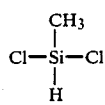

and monomethylamine, followed by reacting the cyclic silazane with ammonia. In this publication, it is stated that this polymer is suitable for use as a material for chemical vapor deposition. However, neither the physical properties of the polymer nor the ceramic yield are described.

(6) K. A. Andrianov and others reported in J. Organamet. Chem. 3, 129–137 ('65), that it is possible to obtain a polymer by the following procedure: react dimethyldichlorosilane and ammonia to produce a silazane compound, and polymerize the silazane compound in the presence of KOH as the catalyst. These reactions are shown below.

Baking the polymer to turn it into ceramic is not mentioned; however, the present inventors consider that this polymer when molded into various shapes will be poor in infusibility, wherefore this polymer, having no radicals that are capable of crosslinking, must receive a considerable amount of highly energized irradiation of electron beam, γ-ray, etc. to become infusible. Also, another inconvenience with this polymer is that its ceramic yield after baking is as small as 35–40%.

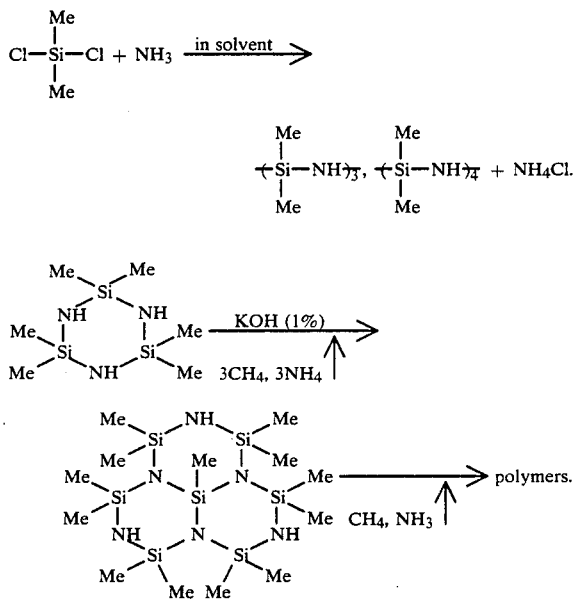

(7) A. A. Zhdanov and others reported in Polym. Sci, USSR 23 (6) 1429–1438 ('81) that a silazane polymer is obtained by reacting trimethyltrivinylcyclotrisilazane with KOH (1%) at 200° C. A disadvantage of this polymer lies in that it undergoes prompt polymerization when heated to temperatures above 200° C. to produce a polymer which is insoluble and infusible, and therefore not moldable. Also, this report does not mention conversion of the polymer to a ceramic.

As is apparent from the foregoing description, hitherto proposed silazane polymers are not appropriate for industrial use as preceramic materials. In addition, these polymers were found to exhibit poor moldability and processability as precursors for ceramic fibers, and poor ceramic yield as well. Ceramic products, e.g., ceramic fibers obtained from the known preceramic polysilazane materials were found to have relatively poor physical properties such as strength, modulus of elasticity and the like.

SUMMARY OF THE INVENTION

It is therefore an object of the present invention to provide a process for manufacturing preceramic materials which is adapted for industrial production and which enables one to produce preceramic materials having good moldability and processability in high ceramic yield.

It is another object of the invention to provide a process for manufacturing ceramics of high quality from the preceramic polymer materials.

The present inventors have investigated processes for manufacturing SiC—Si$_3$N$_4$ type ceramics utilizing the precursor technique and to obtain ceramic precursors having excellent productivity and workability for the manufacture of the ceramic products. As a result, the inventors have proposed methods of manufacturing organic silazane polymers and ceramics therefrom, as disclosed in Japanese Pre-Patent Kokai Nos. 62-290730, 63-117037, 63-193930, and 63-210133. The inventors have further studied the conversion of the polymers obtained by means of the procedures described in paragraphs (6) and (7) above with a view to improving the conversion methods. As a result, the inventors have found that organic silazane polymers exhibiting excellent heat stability, workability (moldability), and infusibility, can be obtained by reacting a mixture comprising 20 to 90 mol. % of at least one organosilicic compound having the formula (I):

in which R may be the same or different and is a methyl group, an ethyl group or a phenyl group, and X represents a chlorine and/or a bromine atom;

and 80 to 10 mol. % of at least one of the organosilicic compound having the formula (II):

in which R represents a methyl group, an ethyl group or a phenyl group, and R$_1$ represents a hydrogen atom or a vinyl group, and X represents a chlorine or a bromine atom; with ammonia to obtain a silazane compound, and polymerizing the thus obtained silazane compound in the presence of an alkali catalyst to eventually obtain the organic silazane polymer.

The inventors have also found that the thus obtained organic silazane polymers have high ceramic yield.

The present invention also provides a method of manufacturing a ceramic which comprises melting, molding, and rendering infusible the organic silazane polymer, and then baking the same.

Particularly, according to the present invention, it is possible to produce in an easy and economical way, a high quality organic silazane polymer exhibiting excellent moldability, workability, and infusibility and having high ceramic yield (usually, for example, 70-80%). Another important advantage of the present invention is that the use of an alkali metal hydride or an alkaline earth metal hydride as the polymerization catalyst can be avoided. Thus, these catalysts are expensive and difficult to handle. In contrast with the method according to the present invention, one can use economical and easy-to-handle polymerization catalysts such as, potassium hydroxide and sodium hydroxide. It is thus possible to manufacture the improved organic silazane polymer in a manner far more economical and industrially advantageous as compared to prior processes. Furthermore, according to the present invention, it is possible to produce an organic silazane polymer having excellent workability and infusibility, as well as far better ceramic yield than the polymers obtained through the procedure described under (6) above.

Further, the method of manufacturing ceramics according to the present invention uses the above-described organic silazane polymers as ceramic precursors so that it enables easy fabrication of ceramic products of various desired shapes which are endowed with excellent properties.

DETAILED DESCRIPTION OF THE INVENTION

In the method of manufacturing the organic silazane of the invention, the following compounds are used as the starting materials:

at least one of the organosilicic compounds of the following general formula (I):

(I)

in which R represents a methyl group, an ethyl group, or a phenyl group, and X represents a chlorine or a bromine atom;

and at least one of the organosilicic compounds of the following general formula (II):

(II)

in which R represents a methyl group, an ethyl group or a phenyl group, and $R_1$ represents a hydrogen atom or a vinyl group, and X represents a chlorine or a bromine atom.

Preferably, the compound of formula (I) is dimethyldichlorosilane.

The compounds represented by the general formula (II) are preferably organosilicic compounds containing a vinyl group as $R_1$, that is, those represented by the formula (IIa). An example thereof is methylvinyldichlorosilane,

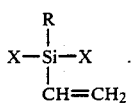
(IIa)

Also preferred as compounds represented by the formula (II) are those wherein $R_1$ is a hydrogen atom as shown by formula (IIb),

(IIb)

The proportion of the compounds (I) to that of compounds (II) in the mixture should be between 20 mol. % to 80 mol. % and 90 mol. % to 10 mol. %, respectively. More preferably, the proportion falls in the range between 30 mol. % to 70 mol. % and 80 mol. % to 20 mol. %, respectively. Mixtures having the compositions in these ranges give organic silazane polymers which possess excellent heat stability, workability, and infusibility. Also, when these organic silazane polymers are baked, the ceramics obtained are greatly improved as compared to the ceramics obtained using conventional precursor methods. For example, the inventive ceramics exhibit improved ceramic yield, tensile strength, and elastic modulus. If, for example, the proportion of the compounds (II) exceeds the upper limit, the resultant organic silazane polymers tend to have poor heat stability and workability. Also, if the proportion of the compounds (II) is smaller than the lower limit, organic silazane polymers are obtained having poor infusibility and low ceramic yield after baking.

If, in the mixture, the compound represented by the formula (II) is composed of both the organic compounds having a vinyl group (IIa) and organic compounds having a hydrogen atom (IIb), the mixing ratio (in terms of mol. %:mol. %) should be between 5:95 and 95:5, respectively, or more preferably between 20:80 and 80:20, respectively.

According to the present invention, the above defined mixture of the organosilicic compounds is reacted with ammonia to produce silazane compounds. Any manner will do for conducting the reaction between the mixture and the ammonia, but a preferred manner consists of reacting the mixture with gaseous $NH_3$ in an organic solvent, and then removing the by-product ammonium chloride, and finally removing the organic solvent by distillation (stripping). The organic solvent used can be, for example, pentane, hexane, benzene, toluene, xylene or diethylether. The amount of the ammonia used can be as many moles as the chlorine in the chlorosilane used, but preferably is 1.2 to 1.5 times as many moles as the same.

Next, according to the present invention, the silazane compounds are polymerized in the presence of an alkali catalyst, preferably KOH or NaOH. The amount of the alkali catalyst added can be in normal cases 0.1 to 5.0 weight %, or preferably 0.1 to 2.0 weight %, based on the weight of the silazane compound. The polymerization process is usually conducted in the absence of a solvent, but it is also possible to conduct it in a solvent. In the latter case, any ordinary organic solvent will do so long as it has a boiling point suited to the polymerization temperature. The polymerization temperature is normally in the range of 0°-350° C., or preferably, 20°-300° C. depending on the desired polymerization degree as well as on the kind of organosilicic compound selected. Further, according to the method of the invention, there is no prescribed after-treatment procedure. However, it is possible to dissolve the polymers after the polymerization in an organic solvent, remove insoluble matter by means of filtration, and then remove the solvent by distillation under atmospheric pressure or reduced pressure. As a result, it is possible to obtain organic silazane polymers having melting points of 60°–200° C., and molecular weights of 800–3000, as determined by the benzene cryoscoping depressant method.

An important advantage of the present invention is that the polymerization is allowed to continue until it ceases of its own accord. This is evidenced by the cessation of the evolution of gas from the polymerization mixture. Thus, there is no need to attempt to stop the polymerization at a midpoint of the reaction.

The degrees of polymerization and the melting points of the silazane polymers can be also suitably controlled by changing the mixing ratios of the above organosilicic compounds.

The silazane compounds produced from the reaction between the above-described mixtures and the ammonia comprise, for example, a silazane trimer and a silazane tetramer having skeleton units as represented by the formulae below, respectively. However, as far as the objects of the present invention are concerned, there is no requirement as to the structure of the silazane compounds.

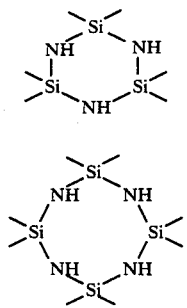

Also, it is thought that, as the silazane compounds undergo polymerization in the presence of an alkali catalyst, an intermediate product having a structure depicted below is produced accompanied by the elimination of $NH_3$ and $CH_4$, and then the intermediate product grows into organic silazane polymers having greater molecular weights.

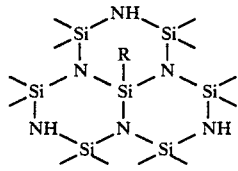

The organic silazane polymers thus obtained have high moldability and processability and, accordingly, can be shaped, as preceramic materials, into suitable forms of shaped articles, such as fibers or sheets. In addition, the polymers may be used as binders or adhesives.

In the process of manufacturing ceramics according to the invention, the organic silazane polymers are melted, molded, infusibilized and finally sintered. For this purpose, the polymers preferably have melting points of from 60° to 200° C. and molecular weights of from 800 to 3000 so that it becomes easier to melt and mold the polymers.

The manner of melting, shaping and sintering of the organic silazane polymers is not critical, but the polymers are molded in desired shapes and sintered to obtain ceramic products of desired forms using conventional procedures.

For instance, when a ceramic fiber is desired, the organic silazane polymer is first heated to form a melt and then spun by melt spinning. The spinning temperature is determined depending on the melting point of the polymer, and is favorably in the range of from 100° to 300° C.

Next, the thread-like material obtained by the spinning is infusibilized by heating in air, irradiation with electron beams in a vacuum or in inert gases such as $N_2$ gas or optically infusibilized by irradiation with ultraviolet beams in an inert atmosphere, such as $N_2$ or Ar gas. In this infusibilization step, the heating in air is preferably effected at a temperature between 50° and 150° C. The electron beam irradiation is preferably conducted at an exposure dose of from 10 to 1000 Mrad. The ultraviolet irradiation may be carried out by using a commercially available ultraviolet lamp having a wave length of 250 to 400 nm. The light quantity of the ultraviolet is preferably adjusted by selecting the intensity of the light source, the irradiating distance and the irradiating time depending on the ease of infusibilization of the particular organic silazane polymer used. In the case where the organic silazane polymers are optically infusibilized by ultraviolet irradiation, it is preferred that the organic silazane polymers obtained using compound (II) having a vinyl radical as $R_1$ are used. However, the organic silazane polymers having a small amount of vinyl radical can be easily optically infusibilized by ultraviolet irradiation if a photosensitizer, vulcanizer, etc. is added to the organic silazane polymer. The blending amount of photosensitizer or vulcanizer is preferably from about 0.0001 to 5 wt. % of the polymer since addition of a larger amount may affect the properties of the resultant polymer. The photosensitizer and the vulcanizer are those known to the art. Examples of the photosensitizer include benzophenone, acetophenone, and rosebengal; examples of the vulcanizer include diphenyl disulfide, 1,3-benzendithiol, 2,2'-dithiobisbenzothiazole, and 2-mercaptethyl sulfide.

The thus infusibilized thread-like material is sintered at high temperatures in a tension-free or tensioned condition, thereby obtaining ceramic fibers composed mainly of SiC and $Si_3N_4$ and having good strength and modulus of elasticity. In this step, the sintering is preferably effected in a vacuum or an atmosphere of one or more gases, such as an inert gas including Ar, etc., $N_2$, $H_2$, $NH_3$ and the like, at a temperature of from 700° to 2,000° C., preferably from 700° to 1,500° C. The sintering under tension is more preferable, since the the ceramic fibers obtained are of high quality having a tensile strength of from 180 to 230 kg/mm² and a modulus of elasticity of from 15 to 20 tons/mm².

When the organic silazane polymer is added as a binding agent to a powder of inorganic compounds selected from the group consisting of alumina, silicon carbide, silicon nitride and boron nitride, a ceramic molding product of high quality can be easily obtained.

As has been described above, the inventive organic silazane polymers, which are thermally stable and have desired degrees of polymerization with good moldability and processability, can be conveniently produced industrially according to the process of the invention. Further, the polymers are excellent in infusibility and high in ceramic yield, and provide organic silazane polymers highly suitable for use as preceramic materials.

On the other hand, according to the process of manufacturing ceramics of the present invention, ceramics of high quality composed mainly of SiC and $Si_3N_4$ can be obtained at a high ceramic yield. Ceramic products in desired forms such as ceramic fibers, ceramic sheets and ceramic molding products having high strength and high modulus of elasticity can be obtained easily by the process of the invention.

The present invention is more particularly described by way of examples, but these examples should not be construed as limiting the present invention.

(EXAMPLE)

Ammonolysis step (1)

[dimethyldichlorosilane:methylvinyldichlorosilane = 50:50 (mol. %)]

A dried 1-liter four-necked flask equipped with a stirrer, a thermometer, an inlet tube for $NH_3$, and a low temperature condenser was charged with 850 ml of hexane, and then with 29.0 g of dimethyldichlorosilane and 31.7 g of methylvinyldichlorosilane, and next the mixture was cooled to $-20°$ C. Excessive gaseous ammonia was passed into this solution at a rate of 20 liter/hr for 2.5 hours (total amount of addition of ammonia: 2.23 mol). The reaction mixture was warmed to room temperature, and meanwhile, in order to allow the unreacted $NH_3$ to escape, the condenser was replaced by an air-cooled condenser.

Next, a by-product ammonium chloride was removed from the reaction mixture by filtration in a dry box. Then, the cake on the filter was washed with 500 ml of hexane, and the filtrate was stripped of the hexane under a reduced pressure (60° C./1 mmHg). The residual (silazane compounds) was a transparent liquid and weighed 34 g. According to the results of gas chromatography and mass spectrography, this liquid was recognized as a mixture of cyclic silazanes represented as below:

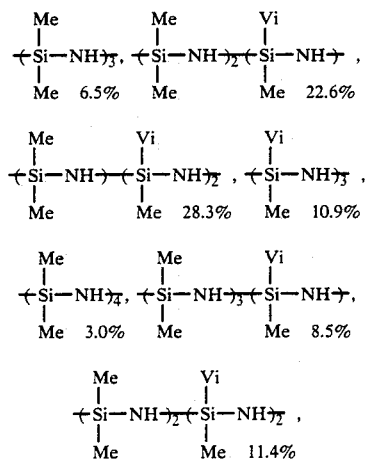

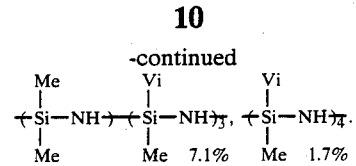

Ammonolysis step (2)

[dimethyldichlorosilane:methylvinyldichlorosilane = 80:20 (mol. %)]

A dried 1-liter flask equipped in the same way as the flask used in case (1) was charged with 850 ml of hexane, and then with 46.4 g of dimethyldichlorosilane and 12.7 g of methylvinyldichlorosilane, and next the mixture was cooled to $-20°$ C. Gaseous ammonia was passed in this solution at a rate of 20 liter/hr for 2.5 hours. This was followed by the same procedure as was carried out in case (1), and 32 g of a transparent liquid (silazane compound) was obtained.

Ammonolysis step (3)

[dimethyldichlorosilane:methylvinyldichlorosilane = 30:70 (mol. %)]

A dried 2-liter four-necked flask equipped in the same way as the flask in case (1) was charged with 1500 ml of dehydrated hexane, and then with 31.0 g of dimethyldichlorosilane and 79.0 g of methylvinyldichlorosilane. This was followed by the same procedure as in case (1), and 63 g of a transparent liquid (silazane compound) was obtained.

Ammonolysis step (4)

[methyldichlorosilane:dimethyldichlorosilane:methylvinyldichlorosilane = 20:40:40 (mol. %)]

A dried 1-liter four-necked flask equipped in the same way as in case (1) was charged with 850 ml of dehydrated hexane, 10.4 g of methyldichlorosilane, 23.2 g of dimethyldichlorosilane and then 25.4 g of methylvinyldichlorosilane, and then gaseous ammonia was passed into the mixture to react therewith. This was followed by the same procedure as in case (1), and 33 g of a transparent liquid (silazane compound) was obtained.

Ammonolysis step (5)

[methyldichlorosilane:dimethyldichlorosilane:methylvinyldichlorosilane = 40:55:5 (mol. %)]

A dried 2-liter flask equipped in the same way as in case (1) was charged with 1500 ml of hexane, 36.8 g of methyldichlorosilane, 56.8 g of dimethyldichlorosilane and then 5.6 g of methylvinyldichlorosilane, and then gaseous ammonia was passed into the mixture to react therewith. This was followed by the same procedure as in the case (1), and 49.6 g of silazane compounds was obtained.

Polymerization step (1)

A dried 100 ml three-necked flask was equipped with a stirrer, thermometer, a water-cooled condenser, and a gas inlet tube for $N_2$, and was charged with 30 g of the product obtained in the ammonolysis step (1) and also 0.3 g of KOH as the catalyst. Then, the mixture was gradually heated. When the temperature reached 115° C., the reacting mixture turned yellow, and at 140° C., evolution of gases was observed. Analysis showed that these gases were $NH_3$ and $CH_4$. Then, the reaction temperature was raised to 225° C., and then the mixture was cooled to room temperature. The product was gluey. Again, the temperature was gradually raised to 280° C., and this temperature was maintained for 5 minutes before it was allowed to drop to room temperature. The product was a vitreous solid of brown color, soluble in organic solvents, such as benzene, hexane, and toluene. Next, this product was dissolved in hexane, and then the solution was filtrated, and the filtrate was stripped of the solvent and low-vapor-pressure volatiles at 200° C., 3 mmHg, whereby 23.1 g of a pale yellow solid was obtained. This substance had a melting point of 112.8° C., and a molecular weight of 1511 (benzene cryoscoping depressant method). Further, the infrared (IR) spectra showed absorption peaks of N—H at 3,400 cm$^{-1}$, C—H at 2,980 cm$^{-1}$, $CH_2$=CH at 1420 cm$^{-1}$, and Si—$CH_3$ at 1,260 cm$^{-1}$.

Polymerization step (2)

Thirty grams of the silazane compound obtained in the ammonolysis step (2) were heated at 300° C. for 5 minutes and thereby caused to undergo polymerization in the same manner as in polymerization step (1) in the presence of 0.3 g of KOH. The same procedure as in polymerization step (1) was followed, and 25.5 g of pale yellow solid was obtained. This substance had a melting point of 162° C., and a molecular weight of 1440 (benzene cryoscoping depressant method).

Polymerization step (3)

Fifty grams of the silazane compound obtained in the ammonolysis step (3) was heated at 195° C. and thereby caused to undergo polymerization in the same manner as in polymerization step (1) in the presence of 0.5 g of KOH. The same procedure as in polymerization step (1) was followed, and 40 g of vitreous solid was obtained. This substance had a melting point of 111° C., and a molecular weight of 1470 (benzene cryoscoping depressant method). The IR spectra showed similar absorption peaks as in the case of the polymer obtained in polymerization step (1).

Polymerization step (4)

Thirty grams of the silazane compound obtained in the ammonolysis step (4) were caused to undergo polymerization in the same manner as in polymerization step (1) in the presence of 0.3 g of KOH. Shortly after addition of the KOH, gas evolution occurred and as the temperature got to 60° C. the gas evolution became vigorous; then the evolution ceased at 80° C. The temperature was raised further to 275° C., and then it was lowered to room temperature whereupon a brown solid was obtained. The same after-treatment was conducted as in the other cases and, as a result, 22.8 g of a pale yellow substance was obtained. This substance had a melting point of 166.4° C., and a molecular weight of 2230 (benzene cryoscoping depressant method).

Polymerization step (5)

Forty-five grams of the silazane compound obtained in the ammonolysis step (5) were heated at 260° C. and thereby caused to undergo polymerization in the presence of 0.45 g of KOH. The same procedure as in the polymerization step (1) was followed, and 34.7 g of a pale yellow solid was obtained. This substance had a melting point of 182° C., and a molecular weight of 2490.

Fiber preparation step (1)

Twenty grams of the silazane polymer obtained in the polymerization step (1) were melt-spun at 170° C. by the use of a mono-hole melt spinning apparatus. The spinning was carried out very satisfactorily even after 4 hours of spinning and was performed at a take-up speed of 420 m/min. Then, the resultant green thread was subjected to an infusibilization treatment by electron beams at 400 Mrad. Then, the thread was sintered under a slight tension in an $N_2$ gas stream for 30 minutes at a temperature of 1100° C., to which the temperature was raised at a rate of 100° C./hr. The ceramic yield was 73%, and the resulting fibrous substance had a fiber diameter of 8μ, tensile strength of 220 kg/mm$^2$ and a modulus of elasticity of 18 t/mm$^2$. When the fiber composition was analyzed by elementary analysis, it was confirmed to be fibers mainly composed of SiC—$Si_3N_4$ comprising 56.7% of Si, 21.1% of C, 18.7% of N and 3.5% of O.

Fiber preparation step (2)

Ten grams of the silazane polymer obtained in the polymerization step (2) were melt-spun at 260° C. by the use of the same spinning apparatus as used in the fiber preparation step (1). The spinning was carried out very satisfactorily. The resultant green thread was slightly tensed and was infusibilized by heating to 80°–150° C. (10° C./hr) in air. Then the thread was sintered in an $N_2$ gas stream for 30 minutes at a temperature of 1250° C., to which the temperature was raised at a rate of 100° C./hr. The ceramic yield was 76%, and the resulting fibrous substance had a fiber diameter of 10μ, tensile strength of 200 kg/mm$^2$ and a modulus of elasticity of 16 t/mm$^2$. Further, the substance was confirmed to be fibers mainly composed of SiC—$Si_3N_4$ comprising 49.5% of Si, 22.5% of C, 17.5% of N and 10.5% of O.

Fiber preparation step (3)

Twenty grams of the silazane polymer obtained in the polymerization step (3) were melt-spun in a dry box at 180° C. and the spinning was performed at a take-up speed of 450 m/min by the use of the same spinning apparatus as used in fiber preparation step (1). The spinning was carried out very satisfactorily throughout. Then, the resultant green thread was subjected to an infusibilization treatment by electron beams at 500 Mrad. The resultant green thread was tensed and was sintered in an $N_2$ gas stream for 30 minutes at a temperature of 1200° C., to which the temperature was raised at a rate of 100° C./hr. The ceramic yield was 81%, and the resulting fibrous substance had a fiber diameter of 6μ, tensile strength of 210 kg/mm$^2$ and a modulus of elasticity of 18 t/mm$^2$.

Fiber preparation step (4)

Ten grams of the silazane polymer obtained in the polymerization step (4) were mixed with 0.1% of rose-bengal as a photosensitizer and 0.5% of 2-mercaptethylsulfide as a curing agent, and then the mixture was dissolved in 50 ml of hexane. Then, the hexane was distilled off under a reduced pressure. The thus prepared polymer was melt-spun at 270° C. by the use of the same spinning apparatus as used in fiber preparation step (1). The resultant green thread was subjected to an infusibilization treatment in an $N_2$ gas stream for 5 hours using a ultraviolet beam irradiation device (mercury lamp H-400P for photochemical use, manufactured by Toshiba Co. Ltd.) placed 15 cm from the thread, and the thread was subjected to photoirradiation from a 15 cm distance. Then, the resultant fibers were sintered under a slight tension for 1 hour at a temperature of 1150° C. to which the temperature was raised at a rate of 100° C./hr. The ceramic yield was 72% and the fiber was found to have a fiber diameter of 8μ, a tensile strength of 185 kg/mm² and a modulus of elasticity of 17 t/mm².

Fiber preparation step (5)

Ten grams of the silazane polymer obtained in the polymerization step (5) were incorporated with 0.2% of 2,2'-dithiobisbenzothiazole as a curing agent, and then the mixture was dissolved in 50 ml of hexane. Next, the hexane was distilled off under a reduced pressure. The thus obtained polymer was melt-spun by the use of the same spinning apparatus as used in fiber preparation step (1). The resultant green thread was infusibilized using an ultraviolet beam irradiation device in the same manner as described under fiber preparation step (4); then, the resultant fibers were sintered at 1200° C. The ceramic yield was 79% and the tensile strength was 205 kg/mm² and the modulus of elasticity was 18 t/mm².

Method of making ceramic molding products

Ten grams of fine SiC powder and two grams of hexane were dispersed and kneaded in 3.0 g of the silazane polymer obtained in the polymerization step (5), and then the hexane was distilled off. The powder was press-molded under a molding pressure of 1,000 kg/cm², thereby obtaining a powder-pressed mold having a diameter of 25 mm and a thickness of 3 mm. Then, the powder-pressed mold was heated in an argon atmosphere, the temperature being raised from the room temperature to 1,000° C. over 2 hours, and from 1,000° C. to 1,950° C. over 1 hour, and being maintained at 1,950° C. over 30 minutes and then allowed to drop to thereby obtain an SiC mold having a density of 2.8 g/cm³ and a bending strength of 25 kg/mm².

(Comparative Example)

Ammonolysis step (1)

A 1-liter four-necked flask equipped with a stirrer, a thermometer, an inlet tube for $NH_3$, and a low temperature condenser was charged with 1500 ml of dehydrated hexane, and then with 90 g of dimethyldichlorosilane. Gaseous ammonia was passed into this solution at a rate of 20 liter/hr for 3.5 hours to cause ammonolysis. Then, the same procedure was followed as that described in ammonolysis step (1) of the Example. As a result, 44 g of transparent liquid was obtained. This was a mixture mainly made up of hexamethylcyclotrisilazane and octamethylcyclotetrasilazane.

Ammonolysis step (2)

A 1-liter four-necked flask equipped in the same way as the flask of the foregoing step (1) was charged with 1500 ml of dehydrated hexane, and then with 98.7 g of methylvinyldichlorosilane. The mixture was allowed to react with ammonia in the same manner as in step (1) above, and 47.0 g of a transparent liquid was obtained. This was a mixture mainly made up of trimethyltrivinylcyclotrisilazane and tetramethyltetravinyltetracyclosilazane.

Polymerization step (1)

Hexamethylcyclotrisilazane was isolated by distillation from the silazane compound obtained in the ammonolysis step (1) of the Comparative Example. After pouring 20 g of the thus obtained hexamethylcyclotrisilazane into a 100-ml three-necked flask, 0.2 g of KOH was added thereto, and then the mixture was heated gradually in an $N_2$ stream and the reaction was allowed to proceed at 280° C. When the mixture was cooled, a yellow massive solid was obtained. This reaction product was dissolved in 50 ml of hexane, and filtrated. Then, the hexane and low vapor pressure components were distilled off at 200° C. under 1 torr, leaving 15 g of pale yellow solid. This substance had a melting point of 161° C., and a molecular weight of 1320 (benzene cryoscoping depressant method). Further, the IR spectra showed absorption of N—H at 3,400 cm$^{-1}$, C—H at 2,980 cm$^{-1}$, and Si—CH$_3$ at 1,260 cm$^{-1}$.

Polymerization step (2)

Trimethyltrivinylcyclotrisilazane was isolated by distillation from the silazane compound obtained in the ammonolysis step (2) of the Comparative Example. After pouring 20 g of the thus obtained trimethyltrivinylcyclotrisilazane into a 100-ml three-necked flask, 0.2 g of KOH was added thereto, and then the mixture was heated gradually in an $N_2$ stream and the reaction was allowed to proceed at 190° C. When the mixture was cooled to room temperature, a greasy substance was obtained. As the mixture was further heated in the flask such that a reaction was allowed to proceed at 200° C. for 5 minutes, the mixture gelatinized rapidly. The solid substance obtained after cooling the product was scarcely soluble in organic solvents (benzene, hexane, THF, CCl$_4$, etc.), and the melting point was higher than 300° C. An attempt was made to control the reaction temperature so as to obtain a polymerization degree at which melt-spinning was possible, but due to the uncontrollable rapid reaction that took place when the temperature was in the vicinity of 200° C., the endeavor was thwarted.

Fiber preparation step

Ten grams of the organic silazane polymer obtained in polymerization step (1) of the Comparative Example were charged into a mono-hole spinning apparatus, and was melt-spun at 250° C. Spinning was carried out satisfactorily, and performed at a take-up speed of 400 m/min. The resultant green thread was subjected to irradiation with electron beams at 100 Mrad, 500 Mrad, and 2 Grad by using an electron beam apparatus; then the fibrous material obtained was sintered in an $N_2$ stream at 1100° C., the temperature having been increased to this value at a rate of 100° C./hr. The threads that had received 100 Mrad or 500 Mrad of electron beams were melted down and did not have a fibrous appearance when taken out of the sintering furnace. The threads that had been exposed to 2 Grad of electron beams retained the fibrous form although some portions were slightly melted; these had a tension strength of 120–180 kg/mm² and a modulus of elasticity of 14–16 t/mm², but the ceramic yield based on the spun green thread was only 38%.

Attempts were made to infusibilize some green threads by oxidation in the air, and others by irradiation with ultraviolet rays; in both cases the infusibilization was a failure for the threads were all melted down during sintering.

What is claimed is:

1. A method for manufacturing organic silazane polymers comprising:

forming a mixture consisting essentially of 20 to 90 mol. % of at least one organosilicic compound having the formula:

in which R is the same or different and represents a methyl group, an ethyl group or a phenyl group, and X represents a chlorine or a bromine atoms;

and 80 to 10 mol. % of at least one organosilicic compound having the formula:

in which R represents a methyl group, an ethyl group or a phenyl group, $R_1$ represents a hydrogen atom or a vinyl group and X represents a chlorine or a bromine atom;

reacting this mixture with ammonia to produce silazane compounds; and polymerizing the silazane compounds in the presence of an alkali metal hydroxide catalyst to obtain organic silazane polymers.

2. The method of claim 1 wherein at least one organosilicic compound (I) is mixed by 30 to 80 mol. % and at least one organosilicic compound (II) is mixed in an amount of 70 to 20 mol. %.

3. The method of claim 1 wherein $R_1$ is a vinyl group.

4. The method of claim 3 wherein compound (II) is methylvinyldichlorosilane, and compound (I) is dimethyldichlorosilane.

5. The method of claim 1 wherein compound (II) is methylvinyldichlorosilane, methyldichlorosilane, or mixtures thereof and compound (I) is dimethyldichlorosilane.

6. The method of claim 3 wherein a mixture of two groups of compounds having the structure of compound (II) is used, the first group being composed of at least one compound wherein $R_1$ is vinyl and the second group wherein $R_1$ is hydrogen, and wherein the ratio in mol. % of the first to the second groups is between 5:95 to 95:5.

7. An organic silazane polymer having a melting point from 60° to 200° C., a molecular weight from 800 to 3000 and a ceramic yield in excess of 70 percent.

8. The silazane polymer of claim 7 having an infrared absorption peak for N—H at 3,400 cm$^{-1}$, C—H at 2,980 cm$^{-1}$, and Si—CH$_3$ at 1,260 cm$^{-1}$.

9. The method of claim 1 wherein said alkali metal hydroxide is potassium hydroxide or sodium hydroxide.

10. A silazane polymer produced by the method of any one of claims 2 to 6 or 9.

* * * * *